Aug. 20, 1940. N. B. LUND Re. 21,536

SEDIMENTATION TANK

Original Filed Nov. 23, 1935 5 Sheets-Sheet 1

INVENTOR
NELS B. LUND
BY
Arthur Middleton
ATTORNEY.

SEDIMENTATION TANK

Original Filed Nov. 23, 1935 5 Sheets-Sheet 2

INVENTOR.
NELS B. LUND
BY Arthur Nissen
ATTORNEY.

Aug. 20, 1940. N. B. LUND Re. 21,536

SEDIMENTATION TANK

Original Filed Nov. 23, 1935 5 Sheets-Sheet 3

Aug. 20, 1940. N. B. LUND Re. 21,536

SEDIMENTATION TANK

Original Filed Nov. 23, 1935 5 Sheets-Sheet 4

INVENTOR.
NELS B. LUND

BY Arthur Davidson

ATTORNEY.

Aug. 20, 1940. N. B. LUND Re. 21,536

SEDIMENTATION TANK

Original Filed Nov. 23, 1935 5 Sheets-Sheet 5

INVENTOR
NELS B. LUND
BY Anton Middleton
ATTORNEY

Reissued Aug. 20, 1940

Re. 21,536

UNITED STATES PATENT OFFICE 21,536

SEDIMENTATION TANK

Nels B. Lund, deceased, late of Seaford, N. Y., by Florence C. Lund, executrix, Seaford, N. Y.; said Nels B. Lund assignor to The Dorr Company, Inc., New York, N. Y., a corporation of Delaware Original No. 2,134,524, dated October 25, 1938, Serial No. 51,193, November 23, 1935. Application for reissue April 16, 1940, Serial No. 329,992

5 Claims. (Cl. 210—55)

This invention relates to sedimentation tanks and more particularly to improvements in sludge removal and withdrawal means therefor operable during the sedimentation operation.

In tanks of this class a raking or collecting device is rendered effective by its reciprocating movement to transfer settled sludge over and along the tank bottom to a sludge collection and outlet zone, while clarification or sedimentation continues in the body of liquid in the tank. Conventional practice provides the sludge to be removed by suction.

In the operation of some such sedimentation tanks there are present two contradictory aims, namely on the one hand to reduce as far as possible the time of detention of settled sludge in the tank, by substantially immediate removal thereof, and on the other hand the removal of as dense a sludge as possible from the clarified liquid. However, with a body of clear water steadily overlying the settled sludge the desired sludge density cannot be attained unless there is made available a sufficient sludge accumulation or reserve in the sludge outlet zone, lest the pump should draw an excess of water, and thus water and power losses should accrue aside from the additional difficulty of having to deal with a dilute sludge for disposal of further treatment. It is therefore customary to employ sludge sumps or depressions of various sizes and shapes in which to maintain the required sludge reserve.

Also with the operation of reciprocating sludge raking mechanism especially in rectangular tanks it is necessary to collect an amount of raked sludge directly at and over a relatively constricted sludge suction outlet, so that it has been customary to provide large wide sludge sumps or hoppers incidentally of such a slope that the sludge received thereby would be sure to gravitate to the vortex or point of sludge suction. Also additional or auxiliary cross conveyors have been used where a reduction of sump size and sludge reserve was to be accepted.

It is one object of the invention to reduce or eliminate the necessity for sump requirements or cross conveyors without foregoing the advantage of having available a desired sludge density at the sludge outlet. In other words, the object is to reduce the expense and labor for excavation and structure, and to reduce total tank depth especially where unfavorable ground water conditions prevail.

Another object is to reduce to a minimum the time of sludge detention in the tank as far as is compatible with a desired sludge density, by reducing the amount of necessary sludge reserve.

Another object is to devise means whereby plain, substantially flat-bottomed tanks having no sludge sumps or sludge removal mechanism, can be converted into tanks with mechanical sludge removal adapted for uninterrupted operation without requiring the breaking through of the tank bottom to supply sludge sumps or to make similar structural changes.

Still another object is to devise improved sludge conveying means of the reciprocating type whereby settled sludge is conveyed from all points and from both ends of a rectangular tank bottom to a restricted sludge outlet therein.

Consequently, this invention contemplates to withdraw settled and collected sludge at certain intervals only, and more particularly only during predetermined periods of relatively greatest sludge density such as occurs upon the arrival of every new sludge load which is pushed towards the outlet zone through the reciprocation of the rakes. More specifically with respect to rectangular tanks it also contemplates the provision of a reciprocating raking mechanism which is effective to transfer settled sludge from all points of the tank bottom including the so-called dead corners or areas thereof towards a restricted zone of sludge discharge and without the use of addition cross conveyors.

According to one feature the invention provides that the sludge withdrawal be controlled or timed so as to take place in a predetermined period during the final phase of the sludge carrying stroke of the reciprocating rake device. To this end, the movement of the sludge scraping device may control the functioning of the sludge suction so that sludge withdrawal is allowed to take place only during a predetermined period in which there is available a suitable although temporary sludge reserve in the way of sludge load brought to the sludge outlet by the sludge conveying stroke of the rake device.

In a preferred form of the invention there is provided an improved raking device of the reciprocating type that will convey the settled sludge from all points of a flat bottom in a manner to have it conveyed substantially directly and from all points of the tank bottom to a relatively restricted suction outlet provided in the flat bottom of the tank. In this way, a sludge conveying stroke of the raking device will in its total effect cause collected sludge to converge upon the restricted outlet and thereby create at and over the outlet a temporary sludge reserve of suitable sludge density. At the same time, sludge withdrawal means such as an outlet valve are automatically operated to become effective during the final phase of the sludge conveying stroke, that is to say, during a predetermined period when the sludge reserve is available.

More specifically the raking device comprises a pair of raking elements depending from a reciprocating carriage and which operate in an alternating and counter current fashion and so that they will clear the sludge from the dead corners of the tank as they convey sludge loads from all points of the tank bottom to and into the sludge outlet.

The invention possesses other objects and features of advantage, some of which, with the foregoing, will be set forth in the following description. In the accompanying drawings, for the purpose of example, there has been illustrated the best embodiment of the invention now known, but such embodiment is to be regarded as typical only of many possible embodiments and the invention is not to be limited thereto, and more specifically the main principle of operation underlying this invention is also applicable to the round type of tank.

In the drawings:

Fig. 4 is an enlarged detail of parts of the valve-actuating mechanism;

Fig. 5 is a detail plan view upon the sludge-outlet valve and operating medium and mounting therefor;

Fig. 6 is an enlarged part sectional plan view upon part of the valve-operating mechanism;

Figure 11:
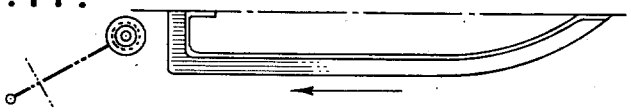
Figs. 11 and 12 are similar to Figs. 9 and 10, with the cam control elements in a position when the sludge-outlet operation has been completed.
Figure 12:
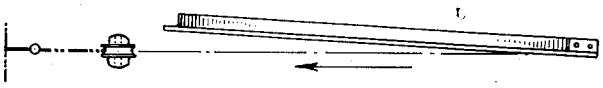
Figure 13:
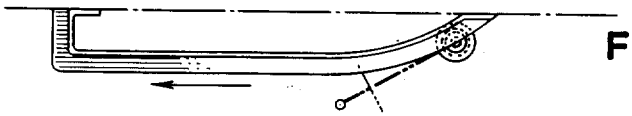
Figure 14:
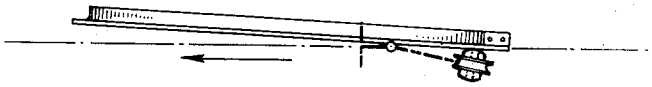
Figure 15:
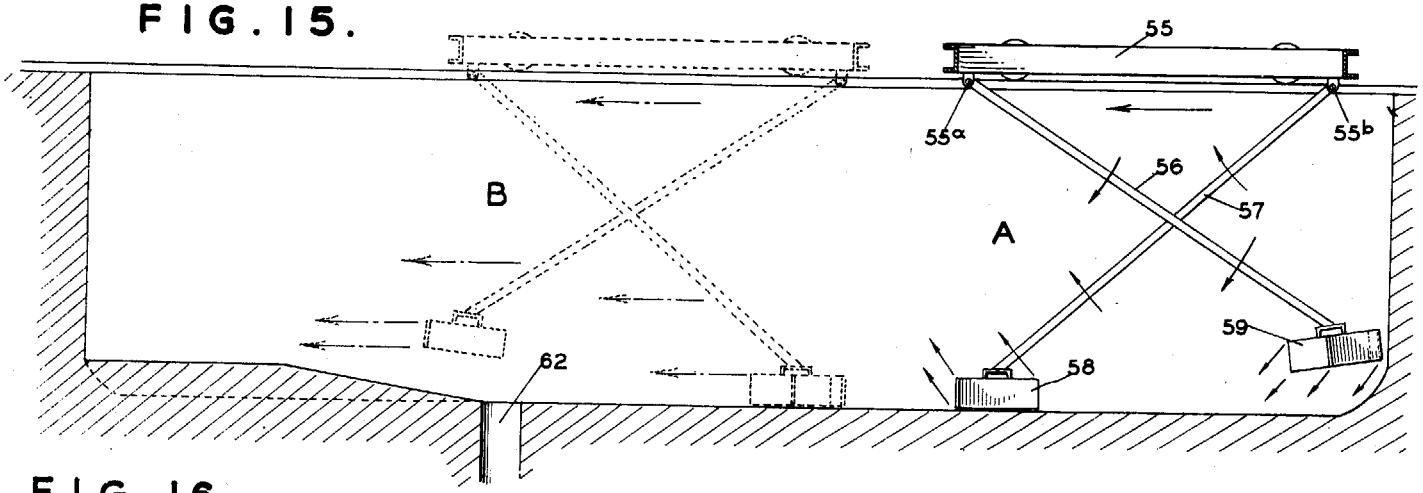
Figure 16:
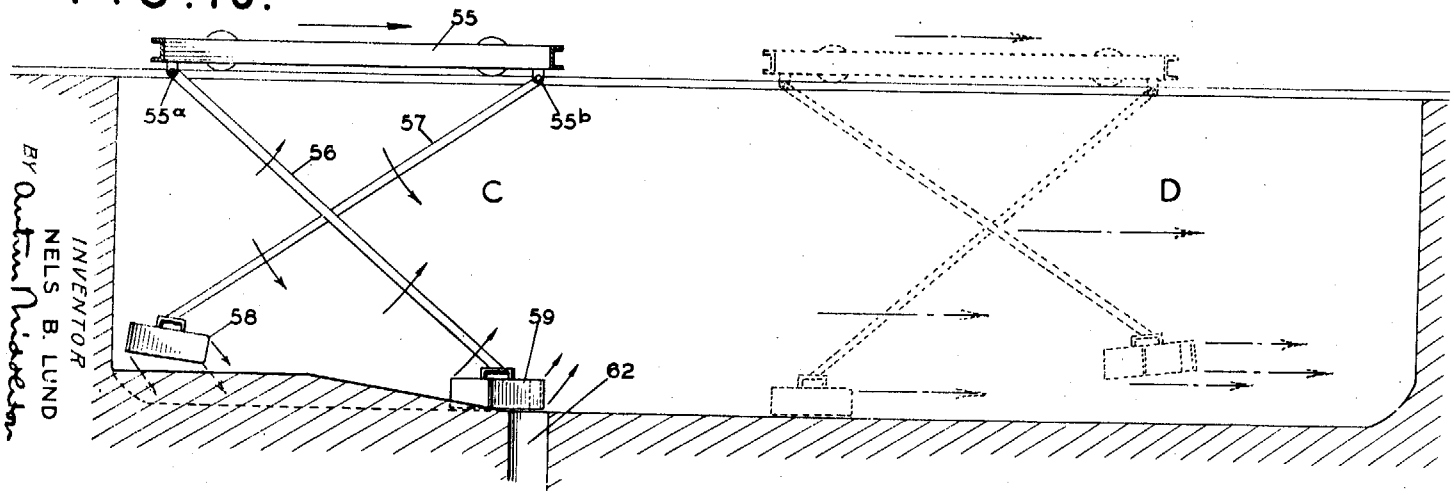

Figs. 13 and 14 are similar to Figs. 11 and 12, with the cam control elements in a position to indicate the one-way camming action thereof with respect to the sludge-outlet operation; and Figs. 15 and 16 are diagrammatic views to show characteristic phases of carriage and rake operation.

Figure 1:
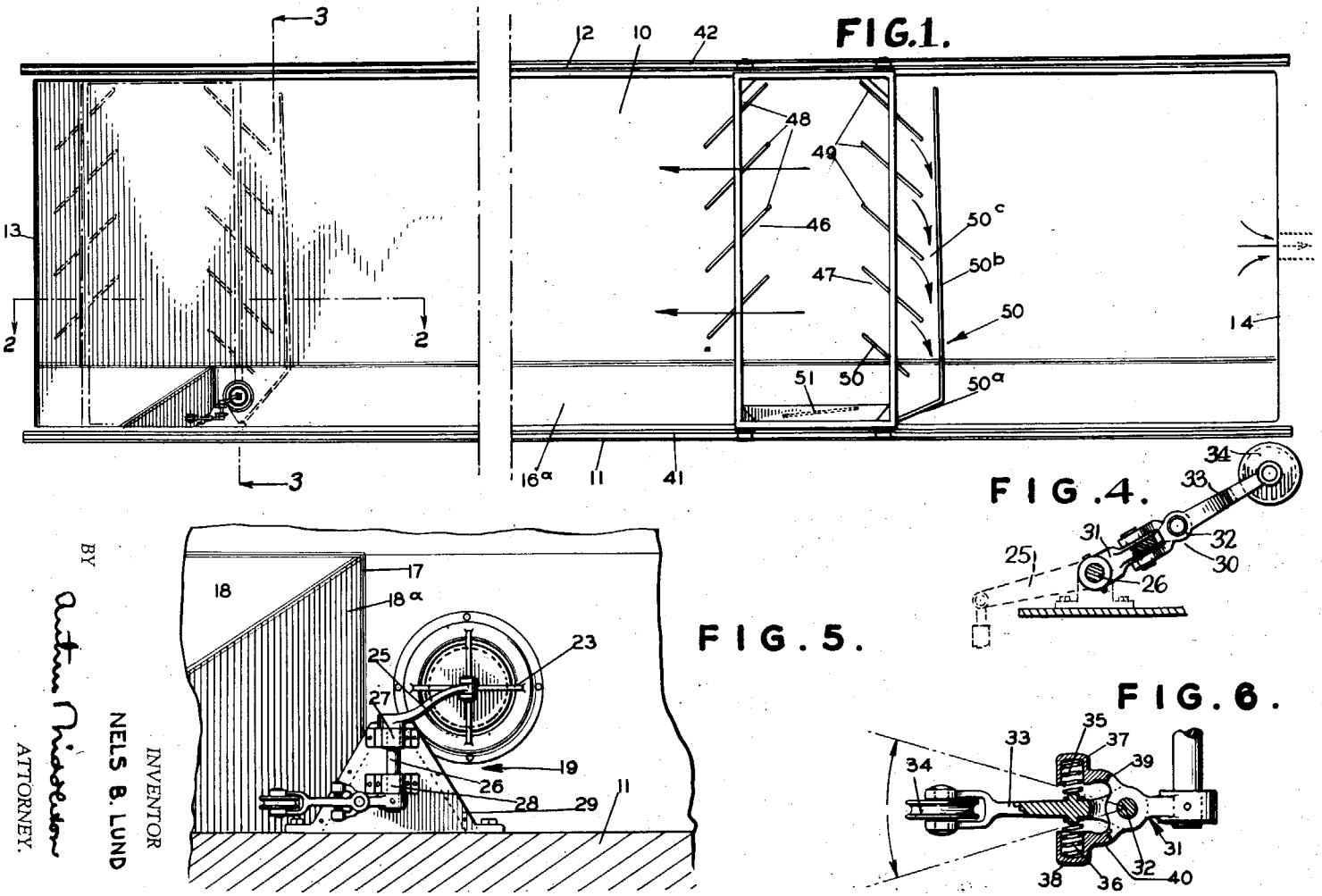
Fig. 1 is a plan view of a rectangular tank equipped with sludge-collecting and sludge-discharge timing means.
Figure 2:
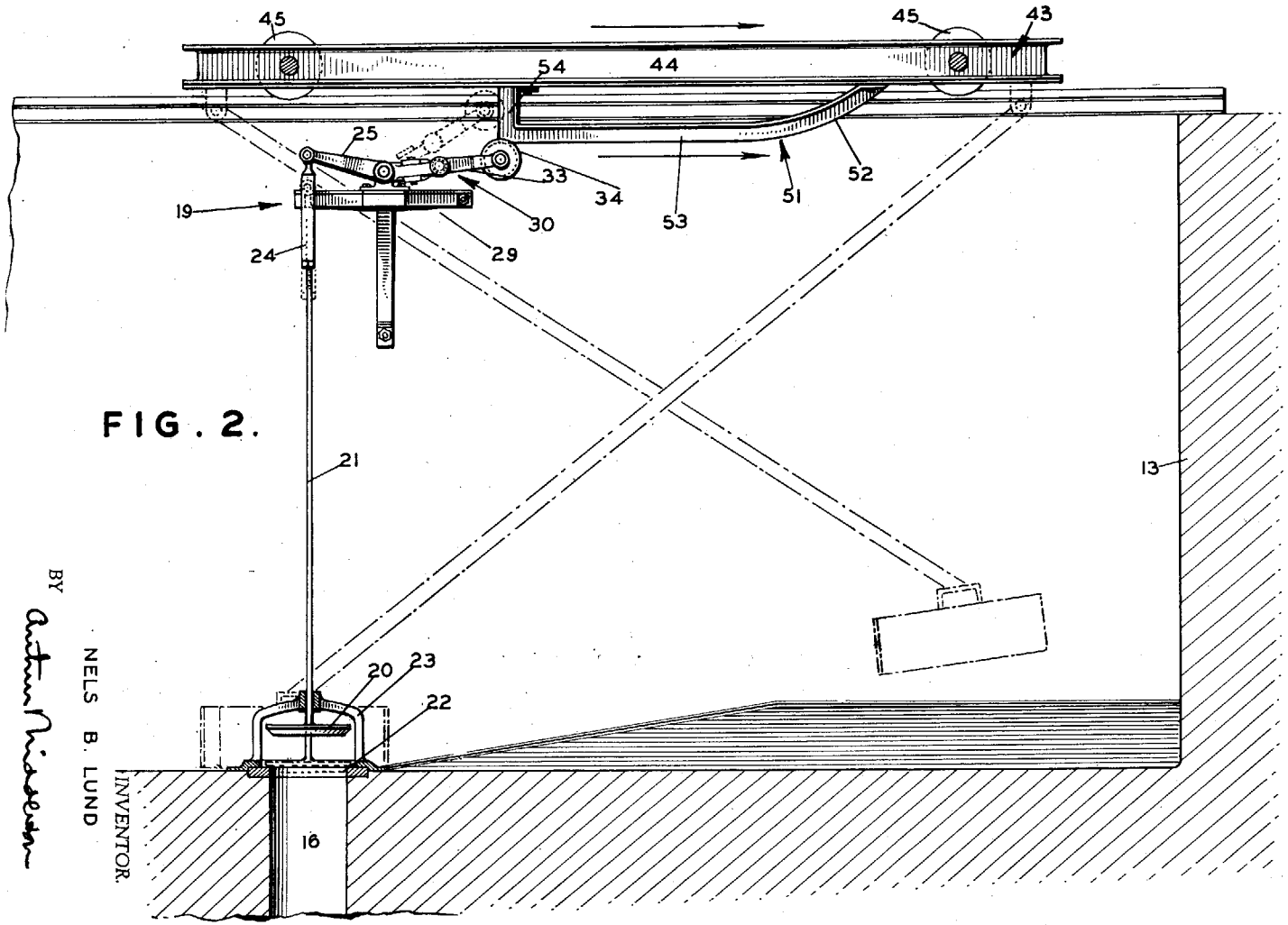
Fig. 2 is an enlarged partial longitudinal section taken upon Fig. 1 and showing sludge outlet valve as controlled by the sludge-collector carriage with the valve open.
Figure 3:
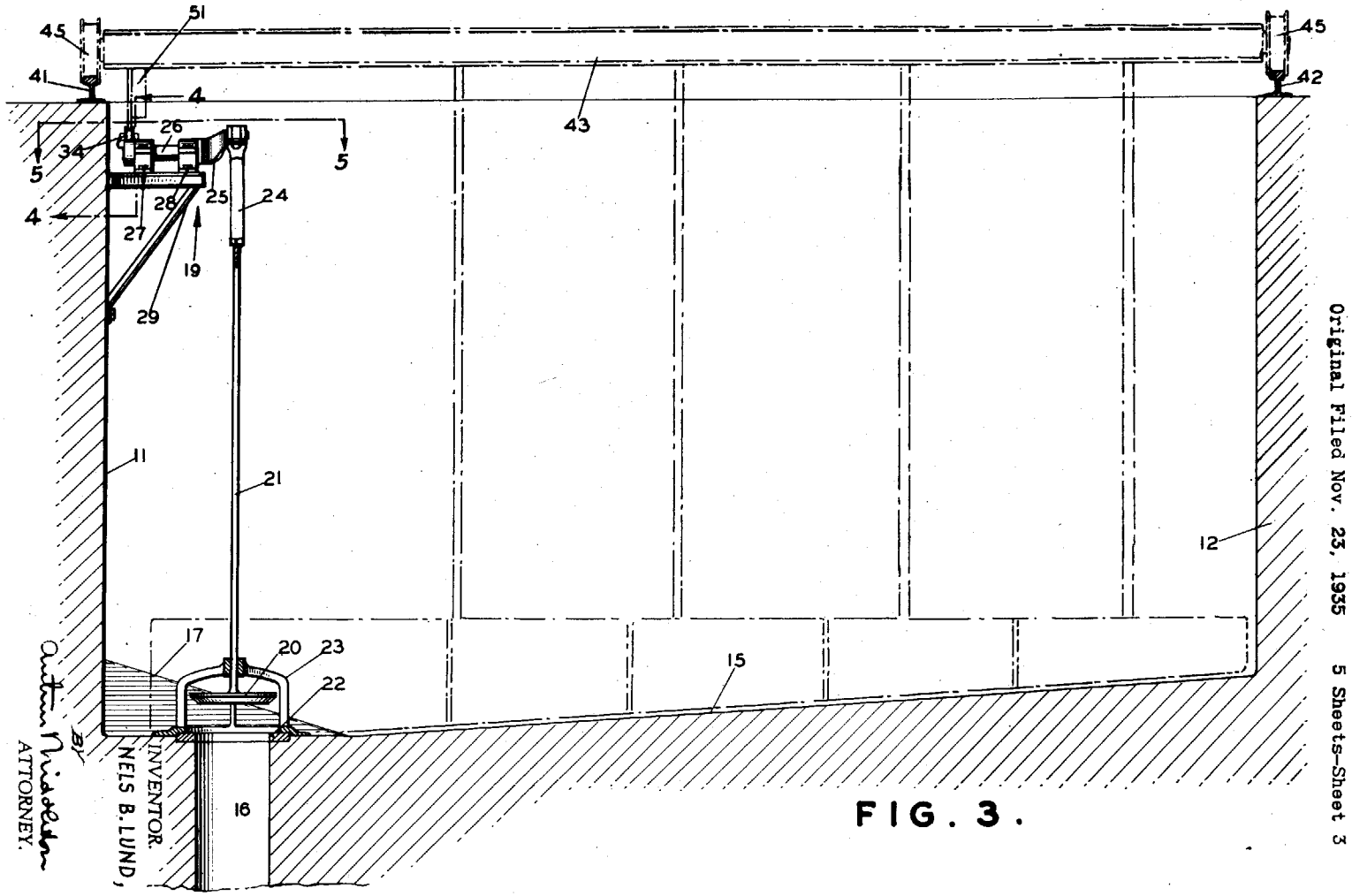
Fig. 3 is an enlarged cross-section taken along the line 3—3 upon Fig. 1, showing sludge outlet valve and actuating mechanism with the valve open.
Figure 7:
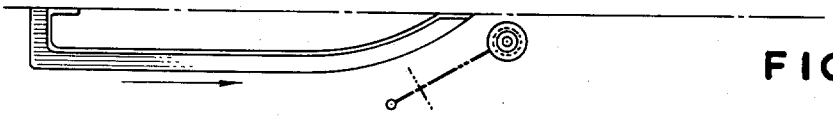
Figs. 7 and 8 are diagrammatic details showing side and plan view, respectively, and the relative position of cam-control elements just ahead of the initial phase of the sludge-outlet operation.
Figure 8:
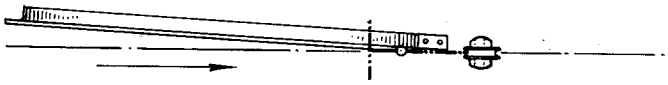
Figure 9:
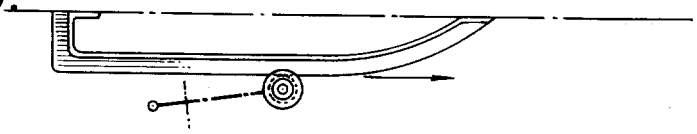
Figs. 9 and 10 are similar to Figs. 7 and 8, with the cam control elements positioned in the middle of the sludge-outlet operation.
Figure 10:
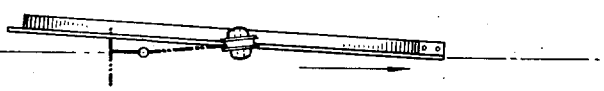

One form of the invention is shown in Fig. 1 in connection with a rectangular tank 10 having side walls 11, 12, and end walls 13, 14, and a substantially flat bottom 15, which is shown to be slightly pitched towards one side of the tank (see Fig. 3), at which side is provided a sludge-outlet opening 16, through which sludge may be withdrawn by suction, and which is herein shown to be located substantially near one end of the tank and shown to be closer to the side wall 11 than to the end wall 13 of the tank.

Extending along the side wall 11 upon the tank bottom, there is indicated a sludge-collecting zone 16a, along which sludge can be moved in a straight path to the sludge outlet. Between the opening 16 and the end wall 13 there is provided a filler portion 17 to fill in the dead corner which is flanked by side wall 11 and end wall 13, and which filler portion has the sloping faces 18 and 18a of a pyramid-like body. A feed inlet for the tank 10 may be provided in connection with the end wall 13 and an outlet for effluent liquid in connection with the end wall 14.

While the actuating means for the sludge-outlet control may be of any desired type, for instance, in the way of a hydraulically-operated valve mechanism, there is described in the following a valve-operating mechanism based upon purely mechanical action.

A sludge-outlet valve and operating mechanism 19 is shown to include a valve disc 20 carried by a valve rod 21, a valve seat 22, a valve yoke 23 for guiding therein the valve rod 21; the valve rod has an adjustable bifurcated top portion 24 by which the total length of the valve rod can be varied. This bifurcated top portion is pivoted to a rocker arm 25 (see detail—Figs. 4 and 6) fastened upon the free end of a rock shaft 26 which is journaled in bearings 27 and 28 mounted upon a bracket 29, which is shown to be anchored upon the inner side of the side wall 11 of the tank.

The other free end of the rock shaft 26 carries another rocker arm 30, which is of special construction to act as a cam-operated lever for the periodic operation of the sludge-outlet valve. This rocker arm 30 is therefore shown to be of composite construction and includes a stub portion 31 fixed to rock shaft 26 in proper angular or staggered relation to the rocker arm 25, and has an articulated connection 32 with a laterally-swingable extension 33, which carries at its free end a cam roller 34. The articulation permits lateral angular movement of the extension 33 relative to the stub portion 31 and thereby makes possible the one way action of the cam roller, as will be described.

The extension 33 is resiliently held in a neutral position by a pair of symmetrically-arranged compression springs 35 and 36, which are seated in opposedly-arranged cup-shaped portions 37 and 38, which are part of symmetrical portions or extensions 39 and 40 of the stub portion 31. By controlling the depression of the cam roller 34 the sludge outlet can be controlled to function within a desired predetermined period, whereby it is understood that the rocking lever carrying the cam roller 34 must be depressed against the weight of a liquid column which loads down the sludge valve when the tank is in operation.

It is noted that the sludge outlet valve herein shown is located substantially at the level of the flat bottom of the tank, and that there is provided no essential transition or sump to lead from the tank into the sludge outlet proper. Nor is there provided a cross conveyor or the like for delivering sludge collected at one end of the tank crosswise to and into the sludge outlet. Consequently, there is herein disclosed a reciprocating sludge-conveying device of improved design, which is to convey the sludge not only lengthwise of the tank, but at the same time in a lateral direction, so that in effect the settled sludge is caused to converge from all points of the tank bottom to the restricted sludge outlet.

It will be understood that the required sludge reserve at the sludge outlet is to be provided by the properly-timed operation of the sludge outlet valve in conjunction with the operation or reciprocation of the sludge-conveying device presently to be described.

Upon the sides of the tank are mounted track rails 41 and 42, upon which operates a carriage 43 spanning the width of the tank, and which comprises a frame 44 supported by track rollers 45. The carriage may be equipped with suitable driving means (not shown) to effect its operation or reciprocation along the tank, that is to say, it may be provided with motor means in the way of a self-propelling carriage, or its movements may be controlled by a rope drive of a suitable kind.

The carriage 43 has depending therefrom two sets of raking elements 46 and 47 (see Fig. 1), which by suitable mechanism (not shown) are controlled to operate in alternating fashion as the carriage reciprocates. The raking element 46, which may hereinafter be called the auxiliary raking element, comprises a series of inclined raking blades 48, which are to be rendered operable when the carriage travels in the direction towards the end wall 14 of the tank and away from the sludge outlet. The other raking element 47, which may hereinafter be called the main or scoop-equipped raking element, comprises a similar, but opposedly-arranged series of inclined raking blades 49, and in addition thereto a scoop member 50, which, in turn, includes a short inclined blade portion 50[a] and a long substantially transverse blade portion 50[b], extending in back of the inclined blades 49 and spaced therefrom as by clearances 50[c]. The raking element 47 is to be rendered operative in alternation with the raking element 46 and during the time the carriage travels toward the end wall 13 of the tank, and towards the sludge outlet.

The carriage frame 44 is shown to have mounted thereon face-downward a cam rail 51, which is to effect the timed operation of the sludge outlet valve through one-way operative engagement with the cam roller 34, incident to the reciprocation of the carriage 43. The cam rail 51 may be adjustable relative to the carriage frame in order to determine and adjust the period of sludge-valve operation. The cam rail as shown comprises a shallow curved portion 52, which defines the opening phase of the valve, a substantially horizontal portion 53 which marks the phase of maximum valve opening, and a vertical portion 54, marking the closing of the valve.

Figs. 15 and 16 are diagrammatic lateral views of the sludge-collection device in the tank. A carriage frame 55 has hinged thereto and suspended therefrom at 55[a] and 55[b], respectively, a pair of rake suspension members 56 and 57, arranged in crosswise or intersecting fashion, and carrying respective rake elements 58 and 59. The rake element 58 corresponds in effect to the auxiliary raking element 46, and the rake element 59 to the main or scoop-equipped rake element 47 of Fig. 1. A sludge outlet is shown at 62, whereas the showing of the sludge discharge control mechanism is not repeated in Figures 15 and 16. The rake elements, through mechanism not shown, are operable in alternating fashion in such a manner that the one is swung up to inoperative position when the other one is lowered to operate upon the tank bottom.

The operation of the sludge-collecting and the sludge-withdrawal means will now be described.

With reference to Fig. 1, the carriage 43 may be assumed to be on its way towards the end wall 13 of the tank 10 and towards the sludge outlet of the tank as indicated by arrows. Through suitable mechanism, not shown, provision is made so that at the time, the scoop-equipped raking element 47 is actively engaged in moving sludge over and along the major portion of the tank bottom in the direction of the end wall 13 and towards the sludge outlet 62. While traveling over the tank bottom, this raking element plows the sludge in a compound movement forwardly and laterally of direction of rake movement as a result of the action of the inclined raking blades 49 and also due to the effect of the slope of the tank bottom 15. The slope of the tank bottom 15 is further conducive to produce movement of the sludge in lateral direction as the sludge is intercepted by the transverse blade portion 50[b] of the scoop-member 50 when the sludge leaving the trailing end of the raking blades 49 passes gradually through the clearances 50[c] towards the side wall 11 and into the collecting zone 16[a] therealong, from which zone it is conveyed substantially directly to the sludge outlet 16 by the scoop member 50 as a whole.

The sludge thus conveyed by the plowing action of the inclined blades 48 in combination with the positive action of the scoop member 50, will provide the required sludge reserve for the sludge withdrawal or sludge suction period during the final phase of this operating stroke of the raking element 47.

The period of sludge withdrawal and the operation of the control mechanism therefor will be more clearly described below. However, it should be clear that after the sludge outlet valve mechanism has been operated and the valve will have been closed, the carriage will have reached its terminal position at the end wall 14 of the tank. The movement of the carriage may then be reversed automatically or otherwise, and along with such reversal some suitable mechanism (not shown) may operate to render inoperative the main raking element 47, while causing the auxiliary raking element 46 to engage upon the sludge deposited in the dead bottom area between the sludge-outlet opening 16 and the end wall 14 of the tank. The rake element 46 which differs by its lack of a scoop element from the main raking element 47, will now operate to bring sludge from the dead area into the operating range of the rake element 47, and in this way sludge from dead areas or corners will ultimately be delivered to and into the sludge-outlet opening 16 as the cycle of carriage reciprocation continues.

The auxiliary raking element 46 may continue operative over and along the tank bottom until the carriage reaches the other end wall 14 of the tank, during which trip away from the sludge outlet this raking element 46 is effective to impart to the sludge a composite movement which is slightly away from the sludge outlet but essentially laterally towards the side wall 11 of the tank, thus contributing to a desired total lateral movement of the sludge, and assisting the main raking element 47 in its tendency to collect sludge in the longitudinal marginal zone along the side wall 11 and ultimately to the sludge outlet.

With respect to the function of the sludge valve proper, it is clear from the drawings that the period of sludge-valve operation during the final phase of the operating stroke of the main raking element 47 is controlled by the engagement of the cam rail 51 upon the cam roller 34. That is to say, as the carriage approaches the end wall 13 of the tank, the curved portion 52 of the cam rail engages upon the cam roller 34 depressing the same and the rocker arm 30 and lifting the valve rod 21 and the valve disc 20, unseating it as against the static pressure of the overlying liquid in the tank. During further progress of the carriage at a predetermined rate of speed the cam roller 34 will ride along the horizontal portion 53 of the cam rail, the length of which determines the period of maximum valve opening to be made available for sludge withdrawal and which is so determined that preferably the volume withdrawn will not exceed the volume of suitable sludge available at the valve outlet.

It is noted that the cam rail 51 is set at a slight angle relative to the direction of carriage movement (see detail—Figs. 8, 10, 12 and 14) so that, as the cam roller 34 follows the guidance of the cam rail, the extension 33 correspondingly assumes a slightly angular position relative to its neutral line, until the cam roller reaches the vertical terminal portion 54 of the cam rail 51. At this time the cam roller 34 will leave the cam rail somewhat abruptly, unless snubbed, to permit the closing of the sludge valve which will promptly occur as a result of hydraulic static pressure acting upon the valve disc, and also to permit the extension 33 to return to neutral position from its angular displacement, and in so doing to escape or dodge the cam rail when subsequently the movement of the carriage is reversed. This means that after carriage reversal the sludge valve remains closed, only to open again whenever the main raking element 47 returns with a new sludge load to furnish a temporary sludge reserve.

The operating cycle of the sludge-collecting and discharge mechanism is furthermore diagrammatically illustrated in Figures 15 and 16, and the respective characteristic operating positions of the sludge-collecting device are designated by the letters A, B, C and D.

When the carriage has reached the position A at the end of a stroke directed away from the sludge outlet 62, the auxiliary rake element 58 is lifted or swung about the pivot 55b as indicated by arrows pointing upwardly, while the scoop-equipped element 59 is lowered or swung about pivot 55a to the tank bottom, as indicated by the arrows pointing downwardly. With the rake element 59 now rendered operative, the carriage 55 travels towards the sludge outlet 62 according to the position B (shown in dotted lines) of the carriage and the horizontal arrows pointing in that direction, the scoop of that rake element then being effected in a positive manner to convey a sludge load to the outlet 62, where it is withdrawn or sucked away during a predetermined period as previously described.

Thereafter (see position C in Fig. 16) the scoop-equipped rake element 59 is lifted in the upward direction of the arows shown, while the auxiliary rake element 58 is lowered (note the downward arrows). The carriage then starts on its return trip away from the sludge outlet 62 with the sludge outlet closed and the auxiliary rake element 58 operative as previously described, whereby the sludge is plowed in a substantially lateral direction without being advanced in a positive manner as it would be by the scoop-equipped raking element 59. This phase of the operating cycle is indicated by the position D (shown in dot and dash) of the carriage and in the showing of the horizontal arrows attached thereto.

I claim:

1. In combination with a rectangular sedimentation tank having side and end walls, a substantially flat bottom, and a relatively restricted sludge outlet adjacent the near end of the tank as distinguished from the opposite end of the tank and which outlet is narrower than the width of the tank; a settled sludge conveying and collecting device comprising a carriage operable in reciprocating fashion along the tank, a main sludge impelling and conveying element and an auxiliary sludge impelling element, both elements depending from said carriage, means for shifting each sludge impelling element in alteration with the other from a lower sludge engaging position to an upper idle position and vice versa to effect operation of said elements alternately countercurrent to one another from the respective ends of the tank, said main sludge impelling and conveying element comprising a scoop element effective to convey sludge from said far end of the tank along a direct path of action towards and into said outlet, and inclined sludge engaging blade means cooperatively associated with said scoop element and effective to transfer sludge laterally of the direction of the carrage imovement into said path of action of the scoop element, said auxiliary sludge impelling member comprising a series of sludge engaging blades inclined in a direction opposite to that in which the main sludge impelling blade means are inclined and substantially effective to convey settled sludge from said near end of the tank into the path of movement of the main sludge impelling and conveying member; and track means for operatively supporting said carriage with respect to the tank.

2. In combination with a rectangular tank having side and end walls, a laterally sloping relatively flat bottom, and a restricted sludge outlet located at the lower portion of the slope, a carriage operable in reciprocating fashion along the tank, a pair of sludge impelling members depending from said carriage, means for shifting each sludge impelling member in alternation with the other from a lower sludge engaging position to an upper idle position and vice versa to effect operation of said members alternately countercurrent to one another from the respective ends of the tank, one of said members comprising inclined blade means effective to impel settled sludge in a direction laterally from the direction of carriage movement, and a scoop element spaced from the trailing end portion of said inclined blade means and arranged to intercept sludge therefrom, and adapted for conveying the intercepted sludge substantially directly to said sludge outlet, said scoop element comprising a blade portion extending substantially transversely across the tank bottom area covered by said inclined raking blade means, the intercepted sludge being urged along said blade portion and down said slope, the other of said pair of members comprising means for transferring sludge into the path of movement of said one of said members; and track means for operatively supporting said carriage with respect to the tank.

3. In combination with a rectangular sedimentation tank having side and ends walls, a substantially flat bottom, a relatively restricted sludge outlet adjacent the near end of the tank as distinguished from the opposite far end of the tank and which outlet is narrower than the width of the tank; means for controlling the discharge of the sludge through the outlet; a settled solids conveying and collecting device comprising a carriage operable in reciprocating fashion along the tank, a main sludge impelling and conveying member and an auxiliary sludge impelling member, both members depending from said carriage, means for shifting each sludge impelling member in alternation with the other from a lower sludge engaging position to an upper idle position and vice versa to effect operation of said members alternately countercurrent to one another from the respective ends of the tank, said main sludge impelling and conveying member comprising a scoop element effective to convey a sludge load periodically and incident to the reciprocation of the element from said far end of the tank along a direct path of action towards and into said outlet, and inclined sludge engaging blade means cooperatively associated with said scoop element and effective to transfer sludge laterally of the direction of the carriage movement into said path of action of the scoop element, said auxiliary sludge impelling member comprising a series of sludge engaging blades inclined in a direction opposite to that in which the main sludge impelling blade means are inclined and substantially effective to convey settled sludge from said near end of the tank into the path of movement of the main sludge impelling and conveying member; track means for operatively supporting said carriage with respect to the tank; and means connected with the carriage for actuating said sludge control means and for effecting sludge discharge during a period substantially coincidental with the arrival of a sludge load at said outlet conveyed thereto by said scoop element.

4. In combination with a rectangular sedimentation tank having side and end walls, a substantially flat bottom, a relatively restricted sludge outlet which is narrower than the width of the tank; means for controlling the discharge of the sludge through the said outlet; a settled sludge conveying and collecting device comprising a carriage operable in reciprocating fashion along the tank, a pair of sludge impelling members depending from said carriage, means for shifting each sludge impelling member in alternation with the other from a lower sludge engaging position to an upper idle position and vice versa to effect operation of said members alternately countercurrent to one another from the respective ends of the tank, one of said sludge impelling members comprising a scoop element effective to convey a sludge load periodically and incident to the reciprocation of the element from one end of the tank along a direct path of action to and into said sludge outlet, and inclined sludge engaging blade means cooperatively associated with said scoop element and effective to transfer sludge laterally of the direction of the carriage movement into said path of action of the scoop element, the other of said pair of members comprising means for transferring sludge into the path of movement of said one of said members, track means for operatively supporting said carriage with respect to the tank, and means connected with the carriage for actuating said sludge control means and for effecting sludge discharge during a period substantially coincidental with the arrival of a sludge load at said outlet conveyed thereto by said scoop element.

5. A sedimentation tank according to claim 4, in which the outlet is located adjacent a side wall of the tank, and in which the direct path of action of the scoop element is accordingly also located adjacent to said side wall.

FLORENCE C. LUND,
*Executrix of the Last Will and Testament of Nels B. Lund, Deceased.*